(12) United States Patent
Ahmad et al.

(10) Patent No.: US 9,213,866 B1
(45) Date of Patent: Dec. 15, 2015

(54) CIRCUITS FOR AND METHODS OF PREVENTING UNAUTHORIZED ACCESS IN AN INTEGRATED CIRCUIT

(71) Applicant: Xilinx, Inc., San Jose, CA (US)

(72) Inventors: Sagheer Ahmad, Cupertino, CA (US); Ygal Arbel, Morgan Hill, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/242,268

(22) Filed: Apr. 1, 2014

(51) Int. Cl.
*G06F 21/76* (2013.01)
*G06F 21/78* (2013.01)

(52) U.S. Cl.
CPC .................................... *G06F 21/76* (2013.01)

(58) Field of Classification Search
CPC ........... G09G 1/02; G06F 21/76; G06F 21/73; G06F 2015/763; G06F 12/1425; G06F 12/14; G06F 21/70
See application file for complete search history.

(56) References Cited

U.S. PATENT DOCUMENTS

| | | | |
|---|---|---|---|
| 5,698,992 A | 12/1997 | El Ayat et al. | |
| 5,883,956 A * | 3/1999 | Le et al. | 713/170 |
| 7,243,227 B1 * | 7/2007 | Knapp | 713/160 |
| 7,343,579 B2 | 3/2008 | Coxe et al. | |
| 7,519,831 B2 | 4/2009 | LeQuere | |
| 7,752,407 B1 * | 7/2010 | Langhammer et al. | 711/164 |
| 7,797,651 B1 | 9/2010 | Jacobson et al. | |
| 7,949,974 B1 | 5/2011 | Moore et al. | |
| 8,667,192 B2 | 3/2014 | Allaire et al. | |
| 8,713,327 B1 | 4/2014 | Peterson et al. | |
| 8,736,299 B1 * | 5/2014 | Pedersen | 326/8 |
| 8,806,654 B2 * | 8/2014 | Thanner et al. | 726/27 |
| 8,863,230 B1 * | 10/2014 | Knapp et al. | 726/2 |
| 2004/0236438 A1 * | 11/2004 | Weber et al. | 700/2 |
| 2006/0133604 A1 | 6/2006 | Buer et al. | |
| 2007/0103193 A1 | 5/2007 | Reblewski et al. | |
| 2007/0118876 A1 | 5/2007 | Singh et al. | |
| 2007/0176631 A1 | 8/2007 | Bakker et al. | |
| 2007/0245141 A1 | 10/2007 | O'Keeffe et al. | |
| 2007/0245413 A1 | 10/2007 | Andolina et al. | |
| 2009/0060197 A1 | 3/2009 | Taylor et al. | |
| 2009/0119773 A1 | 5/2009 | D'Amore et al. | |
| 2009/0128186 A1 | 5/2009 | Balasubramanian et al. | |
| 2010/0077226 A1 | 3/2010 | Senga et al. | |
| 2010/0125739 A1 | 5/2010 | Creary et al. | |
| 2010/0142371 A1 | 6/2010 | Gooch et al. | |
| 2011/0145934 A1 * | 6/2011 | Abramovici et al. | 726/30 |
| 2011/0154043 A1 * | 6/2011 | Lim et al. | 713/172 |

(Continued)

OTHER PUBLICATIONS

Altera Corporation, Cyclone V. Device Handbook, vol. 3: Hard Processor System Technical Reference Manual, Nov. 2012, 670 pages.

(Continued)

*Primary Examiner* — Venkat Perungavoor
(74) *Attorney, Agent, or Firm* — John J. King (57) ABSTRACT

A circuit for preventing unauthorized access in an integrated circuit includes a plurality of circuit block and a plurality of protection circuits. Each protection circuit is coupled to an input of a corresponding circuit block of the plurality of circuit blocks. Each protection circuit determines whether an access request to the corresponding circuit block is authorized. The protection circuits could be implemented to monitor system-on-chip interconnections of master and slave circuits, for example. A method of preventing unauthorized access in an integrated circuit could be implemented using the circuit.

16 Claims, 8 Drawing Sheets

(56) References Cited

U.S. PATENT DOCUMENTS

2012/0166524 A1* 6/2012 Watakabe et al. ............ 709/203
2012/0216242 A1   8/2012 Uner et al.
2014/0101368 A1* 4/2014 Rose et al. .................... 711/103
2014/0115330 A1   4/2014 Chen
2014/0359304 A1* 12/2014 Sethi ............................ 713/189

OTHER PUBLICATIONS

ARM, "CoreLink TrustZone Address Space Controller TZC-380", Revision r0p1, Technical Reference Manual, ARM DDi 0431C, Sep. 10, 2008, 82 pages.

General Dynamics, "Programmable Objective Encryption Technologies Advanced Cryptographic Module", General Dynamics C4 Systems, {Retrieved from Internet Nov. 21, 2011], http://www.gdc4s.com/documents GD-POET-w2.pdf.

General Dynamics, "Technical Requirements Document for the Programmable Objective Encryption Technologies Advanced Cryptographic Module", General Dynamics C4 Systems, {Retrieved from Internet Nov. 21, 2011], http://cryptome.org/poet-acm.htm.

McLean, Mark et al., "FPGA-Based Single Chip Cryptographic Solution (U)," *Military Embedded Systems*, Mar. 2007, pp. 34-37.

Pereira et al., "SSDR—Reconfigurable Firewall: Reconfiguration Model Impact", 2008, IEEE pp. 93-97.

U.S. Appl. No. 12/364,030, filed Feb. 2, 2009, Peterson, et al., Xilinx, Inc., San Jose, CA USA.

U.S. Appl. No. 14/065,804, filed Oct. 29, 2013, Knopp et al., Xilinx, Inc., San Jose, CA USA.

U.S. Appl. No. 14/187,143, filed Feb. 21, 2014, Ahmad et al., Xilinx, Inc., San Jose, CA USA.

Zeineddini et al., "Secure Partial Reconfiguration of FPGAs", 2005, IEEE pp. 155-162.

* cited by examiner

CIRCUITS FOR AND METHODS OF PREVENTING UNAUTHORIZED ACCESS IN AN INTEGRATED CIRCUIT

FIELD OF THE INVENTION

The various circuits relate generally to integrated circuit devices, and in particular to circuits for and methods of preventing unauthorized access in an integrated circuit device.

BACKGROUND

Data processing is an important part of many circuits and systems. Data which may be processed in various circuits or systems may have different levels of security. In devices which process data, certain circuits may be designated as requiring different levels of security than other circuits. For example, data processed by some circuits may require a high level of security compared to other data, which generally requires a lower level of security. Examples of applications which have circuits that require a high level of security could be financial applications, military applications, medical applications, or any other application where compromised data could have an adverse effect. The compromised data may be intentionally altered by an adverse party, or inadvertently altered by virtue of the presence of the connections between the two types of circuits.

A system which consists of multiple heterogeneous sub-systems requires a "protection" mechanism to be able to protect memory and allocate devices (i.e. slaves) to sub-systems (i.e. masters) such that a sub-system can be isolated from erroneous behavior (of software or hardware) of other sub-systems. Connections between the various circuits may provide an access point through which an unauthorized access may occur. The security of the data transferred between the circuits may be compromised, where the compromised data may present a risk to the user of the circuits and systems. To protect from erroneous software or hardware, memory (e.g. DRAM, on-chip-memory), peripherals, and system control registers may be protected from illegal accesses by software or hardware.

SUMMARY OF THE INVENTION

A circuit for preventing unauthorized access in an integrated circuit is described. The circuit comprises a plurality of circuit blocks; and a plurality of protection circuits, each protection circuit being coupled to an input of a corresponding circuit block of the plurality of circuit blocks; wherein each protection circuit determines whether an access request to the corresponding circuit block is authorized.

Another circuit for preventing unauthorized access in an integrated circuit comprises a plurality of master devices; a plurality of slave devices coupled to the plurality of master devices, each slave device of the plurality of slave devices having an input for receiving an access request from a master device; and a plurality of protection circuits coupled to inputs of corresponding slave devices of the plurality of slave devices; wherein each protection circuit determines whether an access request to the corresponding slave device is authorized.

A method of preventing unauthorized access in an integrated circuit is also described. The method comprises providing a plurality of circuit blocks; providing a plurality of protection circuits, wherein each protection circuit is coupled to an input of a corresponding circuit block of the plurality of circuit blocks; and determining, by a protection circuit of the plurality of protection circuits, whether an access request to the corresponding circuit block is authorized.

Other features will be recognized from consideration of the Detailed Description and Claims, which follow.

DETAILED DESCRIPTION OF THE DRAWINGS

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

The circuits and methods set forth below define a protection circuit which is instantiated to monitor system-on-chip (SoC) interconnections between masters (e.g. processors or processors and control circuits of a field programmable gate array (FPGA)) and slaves (e.g. memory or peripherals). The protection circuit as described in more detail below checks for read, write, or other permissions of the master, and "poisons" one or more disallowed transactions. Transactions can be poisoned by advantageously changing the address associated with a request to a poisoned-address-space, or adding a poison attribute in the request, for example. The circuits and methods advantageously provide a protection and isolation means to be able to partition system memory and isolate devices to specific masters such that a number of configurable sub-systems in a SoC can be isolated from each other. The circuits and methods provide a low area and low latency solution by checking the access permissions, and poisoning disallowed accesses, where poisoned accesses are handled at the final destination. The access permissions can be checked by comparing data associated with an access request with data stored in tables.

More particularly, a circuit for advantageously preventing unauthorized access in an integrated circuit is described. The circuit comprising a plurality of circuit blocks; and a plurality of protection circuits, where each protection circuit is coupled to an input of a corresponding circuit block of the plurality of circuit blocks. The protection circuits advantageously determine whether an access request to the corresponding circuit block is authorized. The circuit blocks may comprise master circuits which make access requests to slave circuits, where the protection circuit determines whether the request to the slave circuit is authorized, and how to alter the request if the access request is not authorized. The master circuits may comprise processor circuits or control circuits of an integrated circuit, such as a processor and other control circuits implemented in programmable resources of an FPGA, while the slave devices may include other devices, such as one or more memory devices or other peripheral devices accessed by connectivity interfaces of the integrated circuit.

Figure 1:
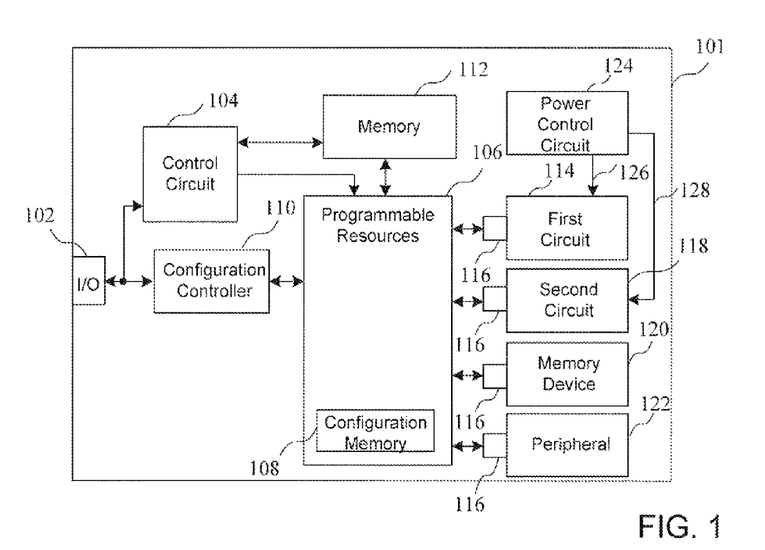
FIG. 1 is a block diagram of an integrated circuit device having protection circuits.

Turning first to FIG. 1, a block diagram of an integrated circuit 101 having protection circuits is shown. The circuit of FIG. 1 is implemented in an integrated circuit having an input/output (I/O) port 102 coupled to a control circuit 104 and programmable resources 106. The programmable resources 106 include circuit elements which are configurable by a user of the circuit to implement a circuit design of the user's choice. The programmable resources 106 may include programmable logic, such as the programmable logic described below in reference to FIGS. 6 and 7.

The circuits implemented in the programmable resources 106 may be implemented according to a configuration bitstream downloaded to the integrated circuit 101. As will be described in more detail below, the programmable resources 106 include configuration memory 108. Generally, configuration memory 108 includes memory cells for configuring the programmable resources 106 based upon configuration bits of the configuration bitstream. Although a single block of programmable resources 106 and configuration memory 108 is shown, a given integrated circuit may include a plurality of blocks having programmable resources controlled by configuration memory. Also, the integrated circuit 101 may include a memory 112, such as a non-volatile memory external to the programmable resources 106, for storing configuration data. A configuration controller 110 may be implemented, as a part of or separate from the control circuit 104, to load the configuration data into the configuration memory 108. The configuration data may be loaded directly by the configuration controller 110 by way of the I/O port 102, or by way of the control circuit 104 and the memory 112.

The integrated circuit 101 may also comprise a first circuit 114 having a protection unit 116 at a first input adapted to receive an access request and a second circuit 118 having a protection circuit 116 at a second input adapted to receive an access request. The integrated circuit 101 may also comprise a memory device 120 and a peripheral device 122, each of which is coupled to a protection circuit 116. The first and second circuits 114 and 118 may be controlled by a power control circuit 124. More particularly, the power control circuit 124 may provide a first power signal 126 to the first circuit 114 and a second power signal 128 to the second circuit 118. As will be described in more detail below, the first power signal 126 may be a low voltage signal and the second power signal 128 may be a high voltage signal. By providing separate power lines, power coupling can be avoided, and the integrity of the signals within the integrated circuit can be maintained.

While first and second circuits 114 and 118 are shown, it should be understood that more than two circuits could be implemented. Further, while the first and second circuits are shown separate from the programmable resources, it should be understood that portions or all of the first and second circuits could be implemented in the programmable resources 106. The circuit of FIG. 1 may be any device having programmable resources, such as a programmable logic device as described below, or an application-specific integrated circuit (ASIC) having a portion of circuits which is programmable. While all of the elements of FIG. 1 are shown as a part of a single integrated circuit, the elements could be implemented in multiple integrated circuits, or in different dies of a multi-chip module, such as the multi-chip module shown in FIG. 8.

Figure 2:
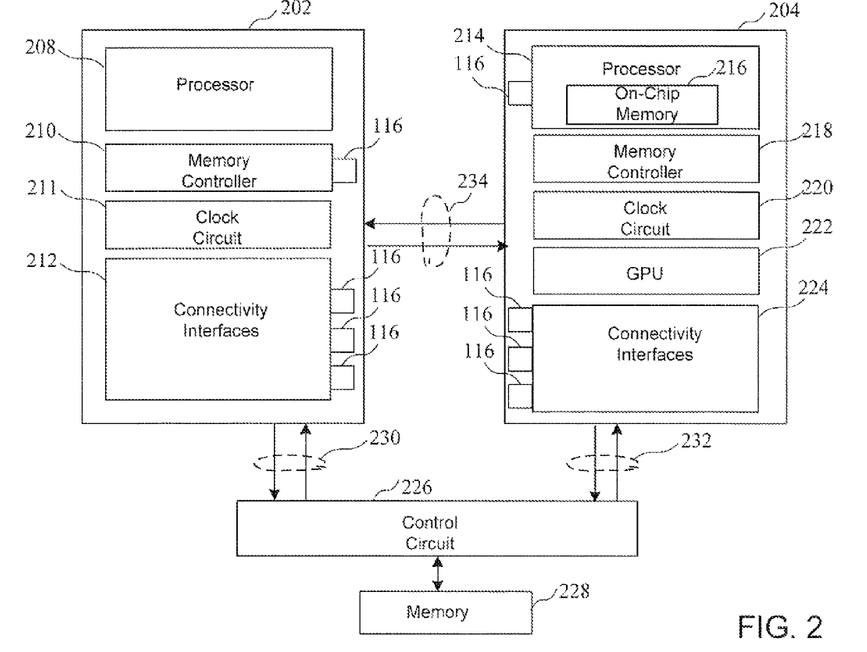
FIG. 2 is a block diagram of a plurality of circuits having protection circuits.

Turning now to FIG. 2, a block diagram of a plurality of circuits having protection circuits is shown. A first circuit 202 may be a low power sub-system (also known as a Red system) having one or more master devices, while a circuit 204 may be a full power sub-system (also known as a Black system) having or enabling connections to one or more slave devices. The first circuit may comprise of a processor 208, a memory controller 210, a clock circuit 211, and connectivity interfaces 212. The second circuit 204 may comprise a processor 214, an on-chip memory 216, a memory controller 218, a clock circuit 220, a graphics processing unit (GPU) 222, and connectivity interfaces 224. Examples of connectivity interfaces 212 and 224 could include any interface which enables access to a peripheral device or memory, such as a Universal Serial Bus (USB) interface, a gigabit ethernet (GbE) interface, a NAND flash interface, and secure digital input output (SDIO)) interface, a quad serial peripheral interface (QSPI), a serial peripheral interface (SPI), a controller area network (CAN) interface, an inter-integrated circuit (I2C) interface, a universal asynchronous receiver transmitter (UART) interface, general purpose input/outputs (GPIOs), or a peripheral component interface express (PCIe) interface, a serial advanced technology attachment (SATA) interface. A control circuit 226 is coupled to a memory 228, and can communicate with the first circuit 202 and the second circuit 204 by way of communication links 230 and 232, respectively. A communication link 234 enables the communication of data between the first circuit block 202 and the second circuit block 204. As will be described in more detail below in reference to FIG. 3, the protection circuits 116 are selectively placed to prevent unauthorized access to particular circuits of the integrated circuit.

Figure 3:
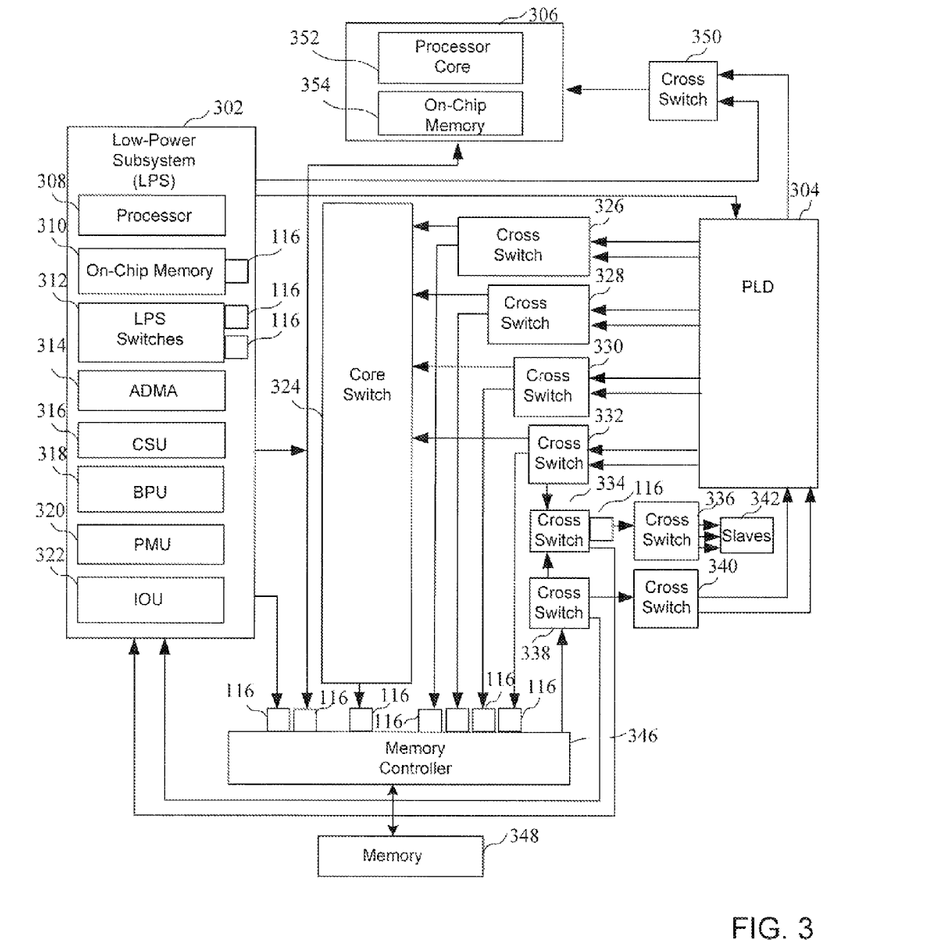
FIG. 3 is another block diagram of a plurality of circuits having protection circuits.

Turning now to FIG. 3, another block diagram of a plurality of circuits having protection circuits is shown. The plurality of circuits of FIG. 3 comprises a low-power sub-system (302), and a remaining portion comprising a full-power sub-system having a programmable logic device (PLD) 304 and a processor 306. The low-power sub-system 302 comprises a number of circuit blocks including a processor 308, an on-chip memory 310, low-power sub-system switches 312, scatter/gather direct memory access (ADMA) 314, a configuration security unit (CSU) 316, a battery powered unit (BPU) 318, a power management unit (PMU) 320, and an input/output unit (IOU) 322.

Communication between the low power sub-system 302, the PLD 304 and the processor 306 is enabled by various switching elements, including a core switch 324 and a plurality of cross switches 326-340. In particular, the cross switch 326 enables communication between the PLD 304 and the core switch 324. The cross switches 328-332 enable communication between the PLD 304 and the core switch 324 as well as the memory controller 346. The cross switch 334 enables communication with slave devices 342 by way of the cross switch 336. The cross switch 338 enables communication between the memory controller 346 (coupled to a memory 348) and the PLD 304 by way of the cross switch 340. A cross switch 350 enables access from the low power sub-system 302 or the PLD 304 to the processor 306, wherein the processor 306 may have a processor core 352 and an on-chip memory 354.

As shown in FIG. 3, protection circuits 116 are placed at inputs of predetermined circuits, such as memory devices or peripheral devices. For example, protection circuits are provided at inputs to the on-chip memory 310 and the low-power sub-system switches 312 of the low power sub-system 302. A protection circuits 116 is also provided an input of a cross switch 336, which provides inputs to slave devices 342. A protection circuit 116 is provided to each input of a memory controller 346. As will be described in more detail below, the protection circuits 116 check access permissions and prevent unauthorized accesses to memory or peripheral devices based upon the source of the access request or various other access permission requirements.

Multiple protection circuits 116 can be used together. For example, as shown in FIG. 3, the LPS switches 312 may require access to more devices than the number of regions associated with a single protection circuit 116. For example, if the LPS switches 312 require access to 32 peripherals, two protection circuits 116 can be used. Further, multiple protection circuits can be implemented to provide redundancy. For example, in order to ensure that a check is performed, redundant protection circuits can be implemented in series. That is, a request will be required to pass both protection circuits to avoid the request from being poisoned. In order to limit the number of protection circuits which are implemented, a single protection circuit can be implemented at a "choke point" of a circuit, so that any request to any number of receiving circuits would have to pass through a protection circuit. That is, rather than implementing a protection circuit for each of a plurality of circuits receiving access requests, a single protection circuit will receive all requests, where an output of the protection circuit will be de-multiplexed to the appropriate receiving circuit. For example, a protection circuit 116 implemented at an output of the cross switch 334 is routed to the single input of the cross switch 336, which functions as a de-multiplexing circuit for a plurality of slave devices 342.

Figure 4:
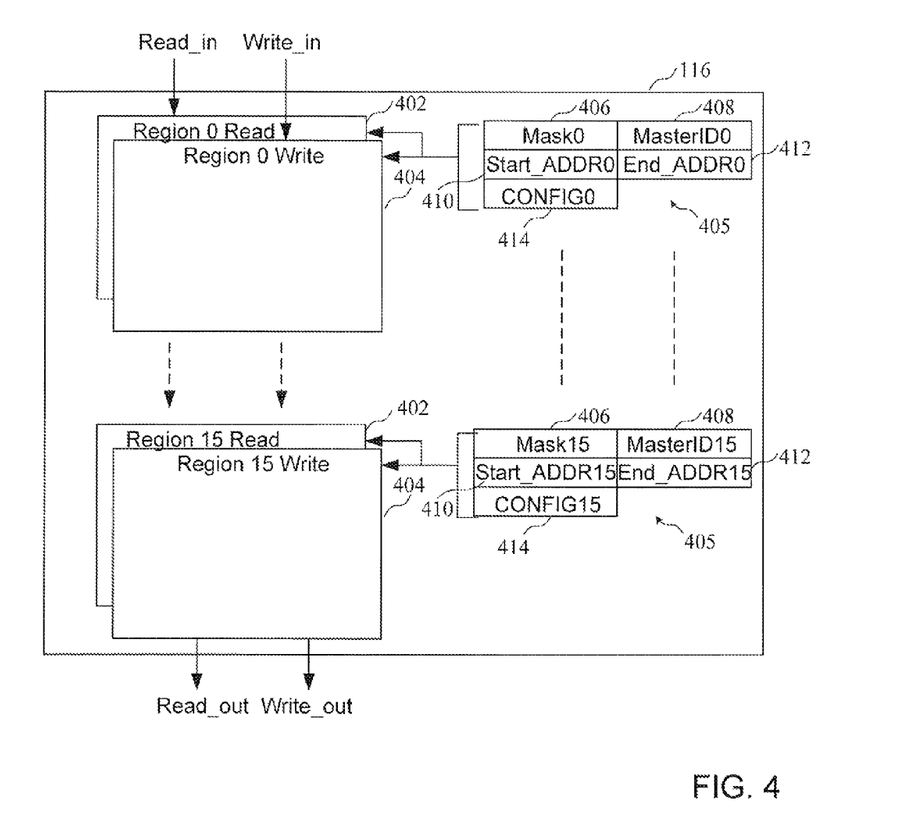
FIG. 4 is a block diagram showing the protection circuits of FIGS. 1-3.

Turning now to FIG. 4, a block diagram shows the protection circuits 116 of FIGS. 1-3. A circuit may be split into various regions, where the regions may be defined by a variety of criteria. For example, the regions may be defined by a particular range of memory locations, a designation as a master or a slave, or what type of transaction is allowed for the region. A region may be enabled or disabled, or only enabled for a particular port, such as a particular advanced extensible interface (AXI) port. Each protection circuit 116 comprises a check block for each region, where 16 regions are shown by way of example in FIG. 4. A protection circuit 116 at a particular location will perform a check of information, provided with an access request, with data stored in tables associated with each region. As will be described in more detail below, because multiple checks may be required to be made and region addresses can overlap, it is necessary to provide a check for each region at each protection unit. By way of example, read check block 402 is provided to enable checks for each region, designated as Region 0 Read-Region 15 Read, and a write check block 404 is provided for each region, designated as a Region 0 Write-Region 15 Write. The read and write inputs (Read_in and Write_in) to the input port are provided to each read check block 402 and each write check block 404 for the regions. A data block 405 is also provided to enable the read and write check blocks 402 and 404 to provide the read and write checking functions. By way of example with reference to Region 0, the data block 405 may comprise mask data (Mask0) 406, a master ID (MasterID0) 408, a start address (Start_ADDR0) 410, and end address (End_ADDR0) 412, and configuration data (CONFIG. 0) 414. Additional details regarding the data shown in data block 405 is provided in Tables 1-9 set forth below. While various data elements of the data block 405 are shown by way of example, it should be understood that the data block could include any information which is necessary to perform an access check, such as a read or write check, which will be described in more detail below. Further, any number of regions could be implemented, where addresses for regions can overlap. In case of overlap, regions could have different priorities, where a higher region number can have higher priority. Each region can be independently enabled or disabled. If a region is disabled, then that region is not used for protection checking. Even if none of the regions is enabled or a request doesn't match into any of the regions, a request could be authorized by a global setting in a control register. For example, if the DefWrAllowed control register is set to a logical zero, as shown in Table 2, then a write is allowed if the write Address/ID doesn't match with any of the enabled region apertures. That is, rather than allowing a request if a write Address/ID matches, all write requests are allowed unless a write Address/ID matches.

The protection circuits 116 are positioned to prevent unauthorized access to particular devices. The protection circuits 116 may be instantiated to monitor SoC interconnections between masters (e.g. processors or a PLD) and slaves (e.g. memory or peripherals). The protection circuits are configurable either one-time or through trusted zone (TZ) accesses. At boot time, a protection circuit can be configured and its configuration is locked such that it can only be reconfigured at next system reset. If the configuration is not locked, then a protection circuit can be reconfigured any number of times by TZ accesses. The access permissions are checked by checking access information sent with an access request, which is provided to a particular port, with data stored in tables associated with the protection circuit, such as data in Tables 1-9. The protection circuit 116 checks for read or write requests or other permissions of the master, and "poisons" unauthorized transactions. The implementation of the protection circuits provides a low area and low latency solution by checking access permissions, and poisoning unauthorized accesses which can be handled at their final destination, as will be described in more detail below. Further, transactions can be poisoned in a number of different ways. For example, a transaction can be poisoned by changing the address of the transaction to a poisoned-address-space. That is, the Read_out or Write_out provided to the receiver of the request would change the address of the transaction to a poisoned address space. Alternatively, a transaction can be poisoned by adding a poison attribute in the original transaction. For example, the request (i.e. Read_out or Write_out generated by the read check block 402 or the write check block 404) provided to the receiver of the request by the protection circuit could include an indication that the request is not authorized. Accordingly, the protection circuit 116 provides a protection and isolation means to be able to partition system memory and isolate devices to specific masters such that a number of configurable sub-systems in a SoC can be isolated from each other.

The protection circuits can be instantiated to check any bus, described below by way of example as an AXI bus, for access permissions. Based on the requestor's Master ID (designated as an AXI-ID) and a request address, a protection circuit checks for access permission. If a request is not allowed, then it is "poisoned" by either adding a poison attribute, or changing the request address to a poisoned address.

By way of example, an incoming read or write request on an AXI port can be checked against each region as follows. If a region is enabled for the AXI port, then that region is considered for that AXI port. If a region is disabled, the region is ignored. For an enabled region, if the address of the transaction (AxADDR) is within the region (i.e. START_ADDR<=AxADDR<END_ADDR), then it is determined whether AXI-ID of the incoming transaction is in the range. For example, it can be determined whether the incoming ID or a portion of the incoming ID matches according to the equation: Incoming_AXIID & MasterID_Mask==MasterID_Value & MasterID_Mask, where the "&" symbol represents a logical "AND" operation. If it is necessary for only certain bits of the received ID to match the stored ID (e.g. AXI-ID[7:4] to match MasterID_value [7:4]), the mask value [7:4]) would be programmed to logical "1 s" and the remaining bits would be programmed to logical "0s". If the address of the transaction is within the correct range and the Master ID is within the correct range, it is then determined if the transaction is allowed or disallowed. That is, read and write permissions are independently checked. If the check fails, then transaction is handled according to the error handling rules set forth below.

If the above address and Master ID range check are true, it is then also determined if a region is configured as secure, in which case only a secure request can access this region. If the transaction is non-secure and the region is configured as secure, then the check fails, and then transaction is handled as according to the error handling rules. It should be noted that, if the region is configured as secure, then region's read/write permissions determine if read/write is authorized in response to a secure request. If read or write permission check fails, then the request is poisoned by adding a poison attribute or poisoning the address as set forth above. An address and AXI-ID of the first transaction which failed a check is recorded, where the failure is recorded as a secure-violation. After the protection circuit poisons the offending transaction, it may optionally generate interrupts, and the destination slave may optionally generate a decoder error (DECERR) for poisoned transaction. Further, a destination slave could handle "poisoned" requests with WI/RAZ (Write-Ignores/Read-All-Zero) response. Only one error is recorded for both read and write channels, where only a first encountered error is recorded. For simultaneous read and write errors, only a write error is recorded.

A memory location, such as a 4 KB poisoned address aperture, may be defined per "choke point," such as the protection circuit 116 associated with the cross switch 336 and the slave 342. Two poisoned apertures may be implemented, one each for LPD and FPD. The poisoned address is routed to a poison-address-space slave which would respond to poisoned transactions similar to undefined-register-space. For example, a response to a poisoned transaction with configurable option of a silent-drop, where no reply is provided, or a decoder error (DECERR) is provided. The poisoned aperture can be allocated to one of the existing blocks. For example, an LPD poisoned aperture can be allocated to an LPDblock which would not implement any register in this 4 KB, but respond to poisoned transactions.

The following Table 1 provides a list of the registers, including the registers of data block 405, as will be described in more detail in reference to each of the tables. A control register of the data block 405 will be described in Table 2, while the poison address register and various error status registers will be described in Tables 3-6. Region start and end addresses of the data block 405 will be described in Table 7. The mask and Master ID data of data block 405 will be described in Table 8, and configuration data of data block 405 will be described in Table 9. It should be noted that the data block 405 of the protection circuits 116 generally have different data, where each occurrence of the protection circuit 116 enables an appropriate check based upon the location of the protection circuit 116. However, the data block 405 of some protection circuits 116 may have the same data. For example, some of the protection circuits 116 at the inputs of the controller 346 may have the same data because they are placed at locations which receive requests from the same master devices.

TABLE 1

List of Registers

| Register Name | Description |
| --- | --- |
| CTRL | control register |
| POISON_ADDR | Poisoned address base |
| ERR_STATUS1 | Error Status Register1 |
| ERR_STATUS2 | Error Status Register2 |
| ERR_STATUS3 | Error Status Register3 |
| REGION_START_ADDR<15:0> | Start address of the region <n>. 1 MB or 4 KB aligned. |
| REGION_END_ADDR<15:0> | End address of the region <n>. 1 MB or 4 KB aligned. |
| REGION_MASTER_ID<15:0> | Master ID value and mask register |
| REGION_CONFIG<15:0> | Region read/write/secure permissions. |

The following Table 2 provides values of a control register, where stored values indicate actions during a poisoning operation, a default write permission, a default read permission, and a register write disable.

TABLE 2

CTRL register

| Field Name | Default | Description |
| --- | --- | --- |
| PoisonCfg | 0 | 0: Transaction poisoning is done by adding poison attribute. 1: Transaction poisoning is done by changing transaction address to poisoned address defined in POISON_ADDR. Default of this is pin configurable. |
| DefWrAllowed | 0 | Default write permission 0: If AXI write Address/ID doesn't match with any of the enabled region apertures, then write is allowed to go through. 1: If AXI write Address/ID doesn't match with any of the enabled regions, then write is poisoned. |
| DefRdAllowed | 0 | Default read permission :0 If AXI read Address/ID doesn't match with any of the enabled region apertures, then read is allowed to go through. 1: If AXI read Address/ID doesn't match with any of the enabled regions, then read is poisoned. |
| RegWrDis | 0 | 0= registers can be written by TZ-access only except ERR_STATUS1. 1=c registers cannot be written except ERR_STATUS1. Once this bit is set, it can only be cleared by a reset. Note: the registers are always readable by secure |

TABLE 2-continued

CTRL register

| Field Name | Default | Description |
|---|---|---|
| | | or non-secure. Also, ERR_STATUS1 is always writeable by secure or non-secure. |

The following Table 3 indicates a poisoned address base-address, where a portion of a transaction address is changed to the poison address base if an access request is unauthorized and the address is poisoned by changing the address location for the reply.

TABLE 3

POISON_ADDR register

| Field Name | Default | Description |
|---|---|---|
| Base[31:12] | 0 | Poisoned address base-address (4 KB aligned). Poisoned transaction address is generated as follows. poisoned_addr[31:0]= {Base[31:12], Original_trans_addr[11:0]} Default of this is configurable. |

Various error conditions can be recorded in the following error status Tables 4-6.

TABLE 4

ERR_STATUS1 register

| Field Name | Default | Description |
|---|---|---|
| INT | 0 | Error interrupt status. It is set when first poisoned request (rd or wr) is encountered. Software needs to clear it. For simultaneous read & write errors, only write error is recorded. |

TABLE 5

ERR_STATUS2 register

| Field Name | Default | Description |
|---|---|---|
| AXI_ADDR[31:0] | RO | Address of the first poisoned (rd or wr) request address. Once error INT is set, no new address is recorded unless INT is cleared. |

TABLE 6

ERR_STATUS3 register

| Field Name | Default | Description |
|---|---|---|
| AXI_ID[N:0] | RO | AXI-ID of the first poisoned (rd or wr) request address. Once error INT is set, no new AXI-ID is recorded unless INT is cleared. |

Each region is defined by Start and End addresses, as set forth in Table 7.

TABLE 7

REGION_START_ADDR<n> and REGION_END_ADDR<n> registers

| | Default | Description |
|---|---|---|
| Value[31:12] (or Value[31:20]) | 0x0 | Start/End address value of this region. 4 KB aligned (Value[31:12]) or 1 MB aligned (Value[31:20]). |

The following Table 8 includes the mask value, and a MasterID value associated with a given region. Each region may have one or more MasterIDs associated with the region.

TABLE 8

REGION_MASTER_ID<n> registers

| Field Name | Default | Description |
|---|---|---|
| Mask[N:16] | 0x0 | Master ID mask. N is max size of AXI-ID |
| Value[N:0] | 0x0 | Master ID value. An AXI request ID will match this Master ID of this region if following is true. AXI_ID[15:0] & Mask[15:0] == Value[15:0] & Mask[15:] |

Finally, the following Table 9 shows levels of checking which may be implemented for a region, whether a region is enabled or disabled, and under what conditions a read or write is allowed.

TABLE 9

REGION_CONFIG<n> registers

| Field Name | Default | Description |
|---|---|---|
| NSCheckType | 0 | 0=Relaxed NS checking. A secure access is allowed to access secure or non-secure region based on Rd/WrAllowed configuration. A non-secure access can only access non-secure region based on Rd/WrAllowed configuration. 1=Strict NS checking. A secure access can only access secure region based on Rd/WrAllowed configuration. A non-secure access can only access non-secure region based on Rd/WrAllowed configuration.. |
| RegionNS | 1 | 0=Region is configured to be secure. 1=Region is configured to be non-secure (NS). |
| WrAllowed | 0 | 0=Write address matching this region are poisoned 1=Write address matching this region are allowed |
| RdAllowed | 0 | 0=Read address matching this region are poisoned 1=Read address matching this region are allowed |
| Enable | 0 | 0=Region is disabled 1=Region is enabled |

Figure 5:
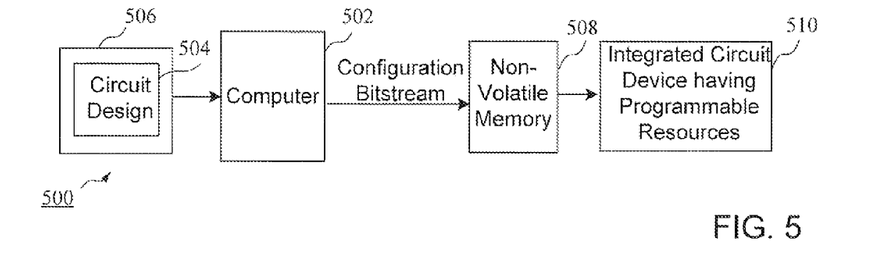
FIG. 5 is a block diagram of system for programming the integrated circuit device.
Figure 6:
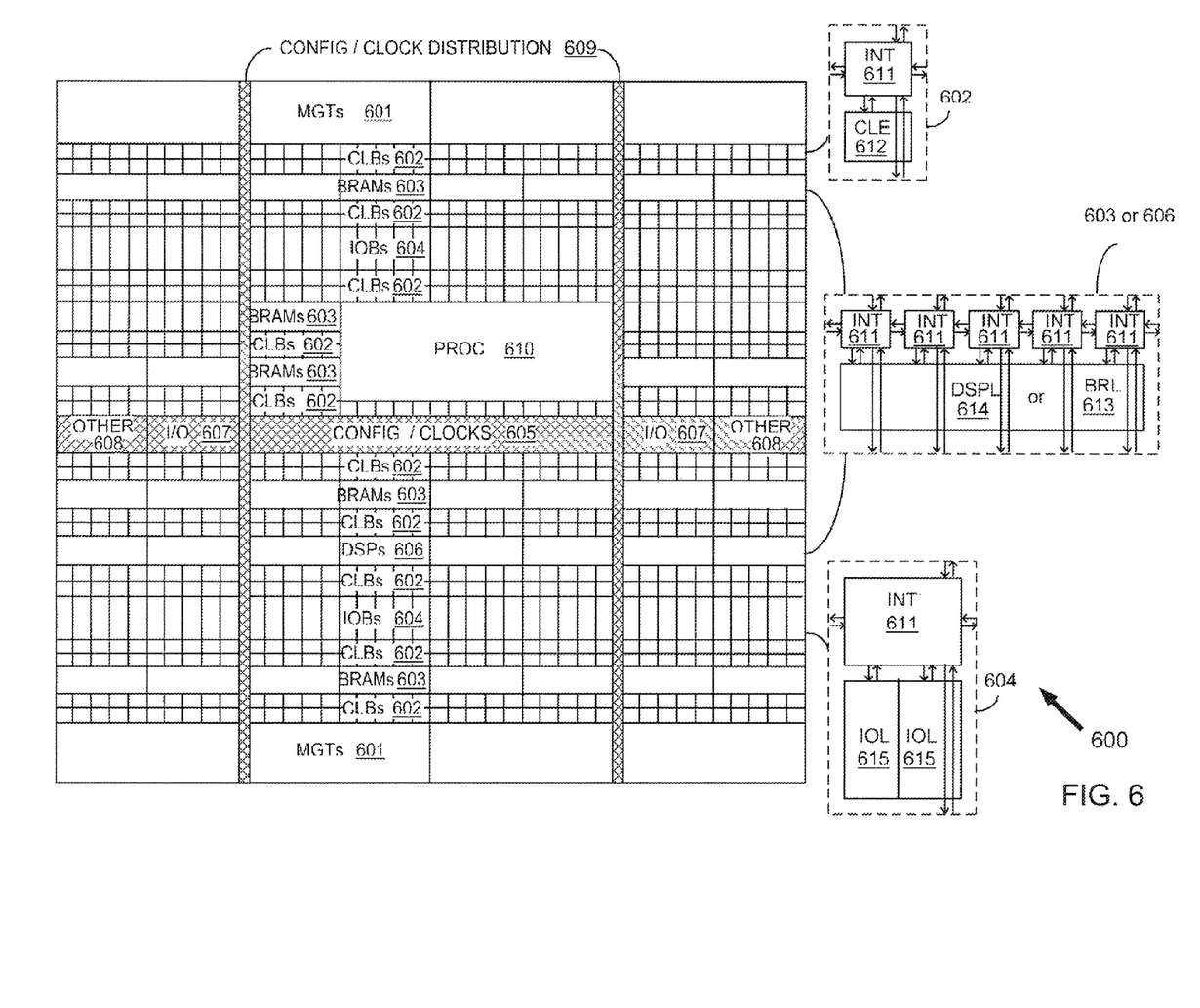
FIG. 6 is a block diagram of an integrated circuit having programmable resources.

Turning now to FIG. 5, a block diagram of system 500 for programming the integrated circuit device of FIG. 6 is shown. In particular, a computer 502 is coupled to receive a circuit design 504 from a memory 506, and generates a configuration bitstream which is stored in the non-volatile memory 506. As will be described in more detail below, the circuit design may be a high level design, such as a circuit design defined in a hardware description language (HDL). Also, the computer may be configured to run software that generates a configuration bitstream which is stored in the non-volatile memory 508 and provided to an integrated circuit 510 which may be a programmable integrated circuit, such as the integrated circuit described below in FIG. 6. As will be described above, bit of the configuration bitstream are used to configure programmable resources of the integrated circuit.

Turning now to FIG. 6, a block diagram of an integrated circuit having programmable resources is shown. While devices having programmable resources may be implemented in any type of integrated circuit device, such as an application specific integrated circuit (ASIC) having programmable resources, other devices comprise dedicated programmable logic devices (PLDs). One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., Flash memory, as in some CPLDs), or in any other type of memory cell.

The device of FIG. 6 comprises an FPGA architecture 600 having a large number of different programmable tiles including multi-gigabit transceivers (MGTs) 601, CLBs 602, random access memory blocks (BRAMs) 603, input/output blocks (IOBs) 604, configuration and clocking logic (CONFIG/CLOCKS) 605, digital signal processing blocks (DSPs) 606, specialized input/output blocks (I/O) 607 (e.g., configuration ports and clock ports), and other programmable logic 608 such as digital clock managers, analog-to-digital converters, system monitoring logic, and so forth. Some FPGAs also include dedicated processor blocks (PROC) 610, which may be used to implement a software application, for example.

In some FPGAs, each programmable tile includes a programmable interconnect element (INT) 611 having standardized connections to and from a corresponding interconnect element in each adjacent tile. Therefore, the programmable interconnect elements taken together implement the programmable interconnect structure for the illustrated FPGA. The programmable interconnect element 611 also includes the connections to and from the programmable logic element within the same tile, as shown by the examples included at the top of FIG. 6.

For example, a CLB 602 may include a configurable logic element (CLE) 612 that may be programmed to implement user logic plus a single programmable interconnect element 611. A BRAM 603 may include a BRAM logic element (BRL) 613 in addition to one or more programmable interconnect elements. The BRAM includes dedicated memory separate from the distributed RAM of a configuration logic block. Typically, the number of interconnect elements included in a tile depends on the height of the tile. In the pictured implementation, a BRAM tile has the same height as five CLBs, but other numbers may also be used. A DSP tile 606 may include a DSP logic element (DSPL) 614 in addition to an appropriate number of programmable interconnect elements. An IOB 604 may include, for example, two instances of an input/output logic element (IOL) 615 in addition to one instance of the programmable interconnect element 611. The location of connections of the device is controlled by configuration data bits of a configuration bitstream provided to the device for that purpose. The programmable interconnects, in response to bits of a configuration bitstream, enable connections comprising interconnect lines to be used to couple the various signals to the circuits implemented in programmable logic, or other circuits such as BRAMs or the processor.

In the pictured implementation, a columnar area near the center of the die is used for configuration, clock, and other control logic. The config/clock distribution regions 609 extending from this column are used to distribute the clocks and configuration signals across the breadth of the FPGA. Some FPGAs utilizing the architecture illustrated in FIG. 6 include additional logic blocks that disrupt the regular columnar structure making up a large part of the FPGA. The additional logic blocks may be programmable blocks and/or dedicated logic. For example, the processor block PROC 610 shown in FIG. 6 spans several columns of CLBs and BRAMs.

Note that FIG. 6 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual FPGA more than one adjacent column of CLBs is typically included wherever the CLBs appear in order to facilitate the efficient implementation of user logic. While the implementation of FIG. 6 relates to an integrated circuit having programmable resources, it should be understood that the circuits and methods for enabling the testing of input/output pads.

Figure 7:
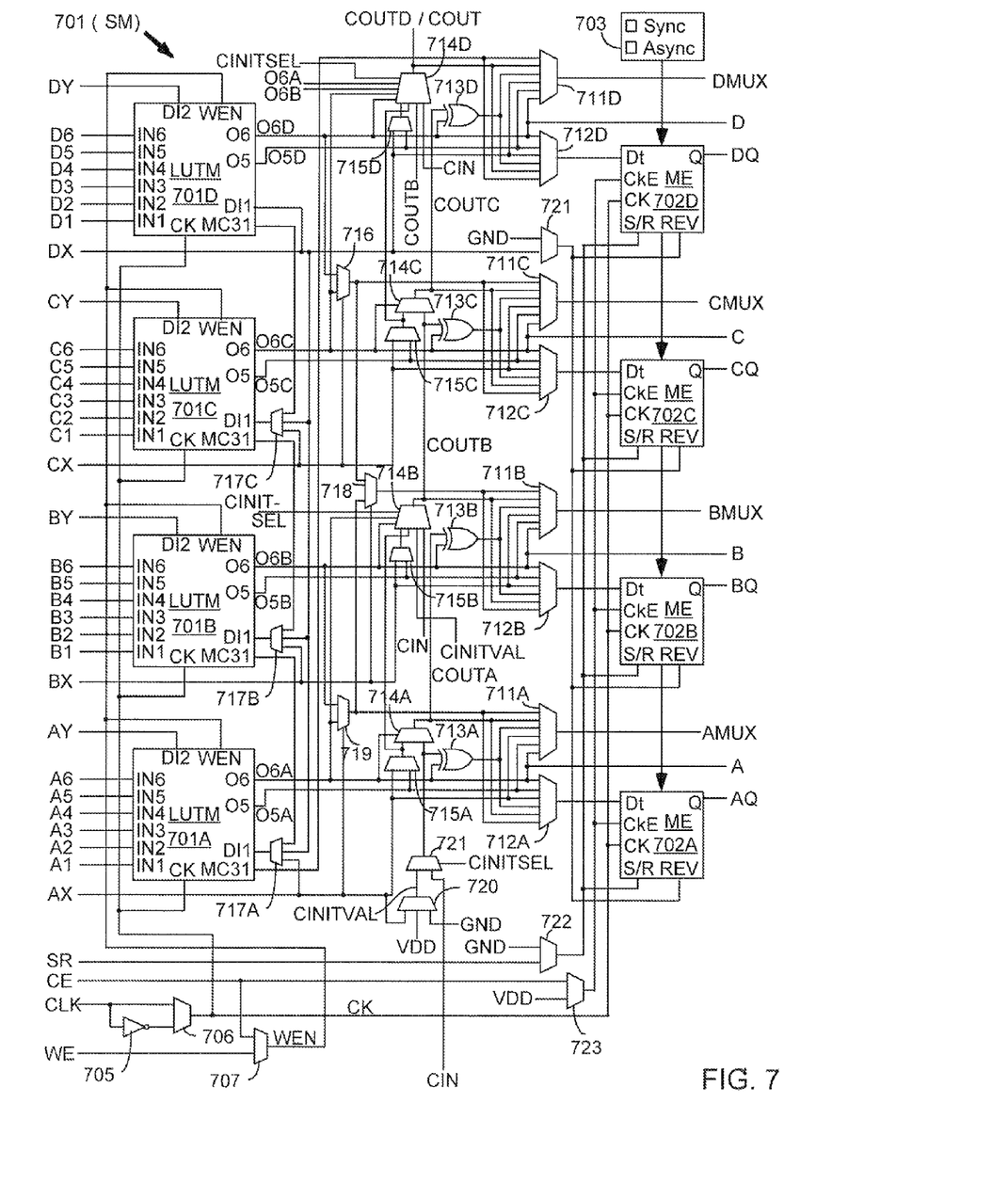
FIG. 7 is a block diagram of a configurable logic element of the integrated circuit of FIG. 6.

Turning now to FIG. 7, a block diagram of a configurable logic element is shown. In particular, FIG. 7 illustrates in simplified form a configurable logic element of a configuration logic block 602 of FIG. 6. In the implementation of FIG. 7, slice M 701 includes four lookup tables (LUTMs) 701A-701D, each driven by six LUT data input terminals A1-A6, B1-B6, C1-C6, and D1-D6 and each providing two LUT output signals O5 and O6. The O6 output terminals from LUTs 701A-701D drive slice output terminals A-D, respectively. The LUT data input signals are supplied by the FPGA interconnect structure via input multiplexers, which may be implemented by programmable interconnect element 711, and the LUT output signals are also supplied to the interconnect structure. Slice M also includes: output select multiplexers 711A-711D driving output terminals AMUX-DMUX; multiplexers 712A-712D driving the data input terminals of memory elements 702A-702D; combinational multiplexers 716, 718, and 719; bounce multiplexer circuits 722-723; a circuit represented by inverter 705 and multiplexer 706 (which together provide an optional inversion on the input clock path); and carry logic having multiplexers 714A-714D, 715A-715D, 720-721 and exclusive OR gates 713A-713D. All of these elements are coupled together as shown in FIG. 7. Where select inputs are not shown for the multiplexers illustrated in FIG. 7, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 7 for clarity, as well as from other selected figures herein.

In the pictured implementation, each memory element 702A-702D may be programmed to function as a synchronous or asynchronous flip-flop or latch. The selection between synchronous and asynchronous functionality is made for all four memory elements in a slice by programming Sync/Asynch selection circuit 703. When a memory element is programmed so that the S/R (set/reset) input signal provides a set function, the REV input terminal provides the reset function. When the memory element is programmed so that the S/R input signal provides a reset function, the REV input terminal provides the set function. Memory elements 702A-702D are clocked by a clock signal CK, which may be provided by a global clock network or by the interconnect structure, for example. Such programmable memory elements are well known in the art of FPGA design. Each memory element 702A-702D provides a registered output signal AQ-DQ to the interconnect structure. Because each LUT 701A-701D provides two output signals, O5 and O6, the LUT may be configured to function as two 5-input LUTs with five shared input signals (IN1-IN5), or as one 6-input LUT having input signals IN1-IN6.

In the implementation of FIG. 7, each LUTM 701A-701D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 717A-717C for LUTs 701A-701C), or to the two 32-bit RAMs via input terminals DI1 and DI2. RAM write operations in the LUT RAMs are controlled by clock signal CK from multiplexer 706 and by write enable signal WEN from multiplexer 707, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 701A may also be provided to the general interconnect structure for shift register chaining, via output select multiplexer 711D and CLE output terminal DMUX. Accordingly, the circuits and methods set forth above may be implemented in a device such as the devices of FIGS. 6 and 7, or any other suitable device.

Figure 8:
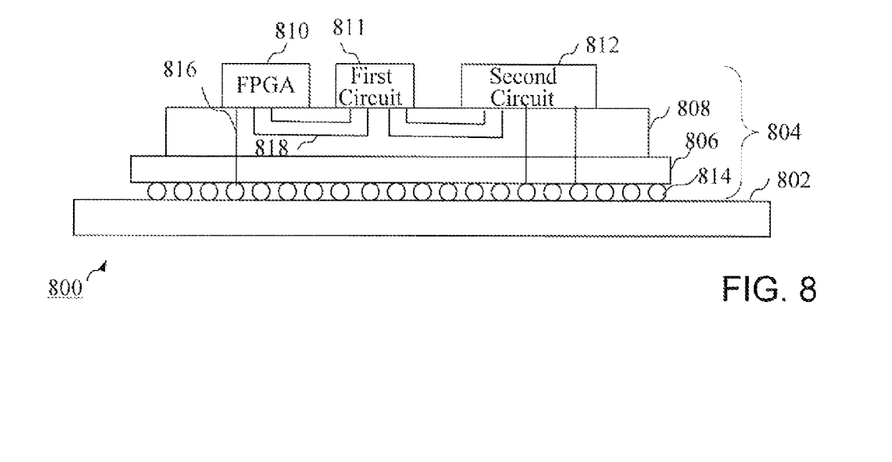
FIG. 8 is a block diagram of an integrated circuit having multiple die.

Turning now to FIG. 8, a block diagram of an SoC integrated circuit 800 having multiple die is shown. According to the embodiment of FIG. 8, a circuit board 802, such as a printed circuit board, is configured to receive a multi-die integrated circuit 804. The multi-die integrated circuit 804 comprises a substrate 806 coupled to receive an interposer circuit 808. The interposer 808 enables coupling multiple integrated circuit chips or die, such as FPGA chip 810 and first and second circuits 811 and 812, to the substrate 806. The interposer circuit 808 could be implemented using programmable interconnects. Solder balls 814 enabling enable coupling signals from the various chips to the circuit board 802 by way of various interconnects 816, such as through silicon vias (TSVs). Interconnects 818 also enable the routing of signals between the various chips of the multi-die integrated circuit. The interposer circuit 808 may be a silicon substrate with various metal layers comprising interconnect elements enabling the routing of signals between the FPGA chips and the data converter chip or between one of the chips and the substrate 806. However, the interposer circuit could be any material having conductive elements which enable routing signals as shown. While all of the circuits of the FPGA chips 810 and the data converter chip 812 could be implemented on a single die, the embodiment of FIG. 8 enables more efficiently implementing the various circuits of FPGA chips 810 and the data converter chip 812. For example, some circuits may be more efficiently implemented in an integrated circuit chip manufactured according to one process, such as a process forming transistors of a certain dimension, while other circuits may be implemented more efficiently in an integrated circuit chip manufactured according to another process.

Figure 9:
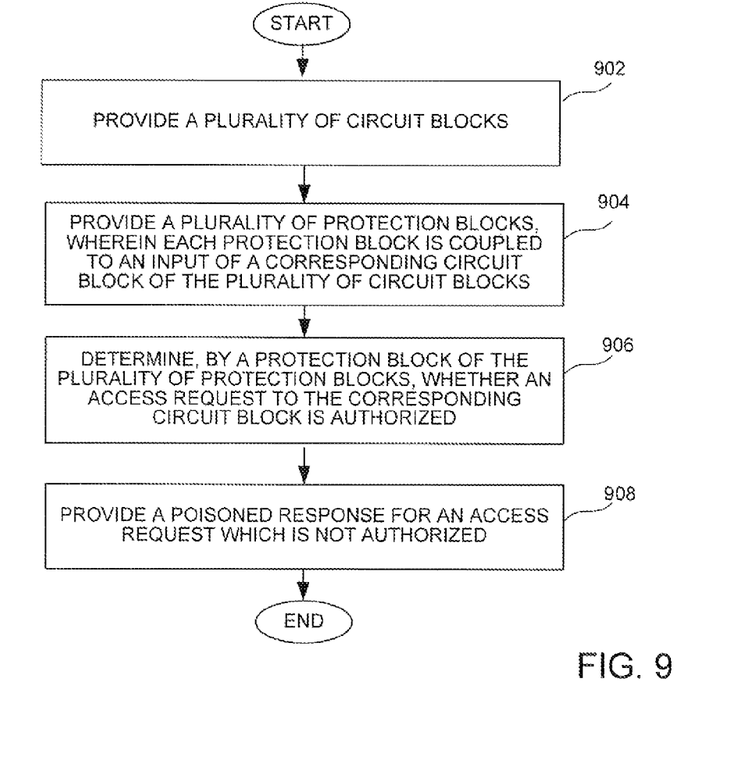
FIG. 9 is a flow chart showing a method of preventing unauthorized accesses to devices in an integrated circuit.

Turning now to FIG. 9, a flow chart shows a method of preventing unauthorized accesses to devices in an integrated circuit. A plurality of circuit blocks providing at a block 902. A plurality of protection circuits are provided at a block 904, wherein each protection circuit is coupled to an input of a corresponding circuit block of the plurality of circuit blocks. It is then determined, by a protection circuit of the plurality of protection circuit, whether an access request to the corresponding circuit block is authorized at a block 906. A poisoned request is then provided at a block 908 if a request is not authorized.

Figure 10:
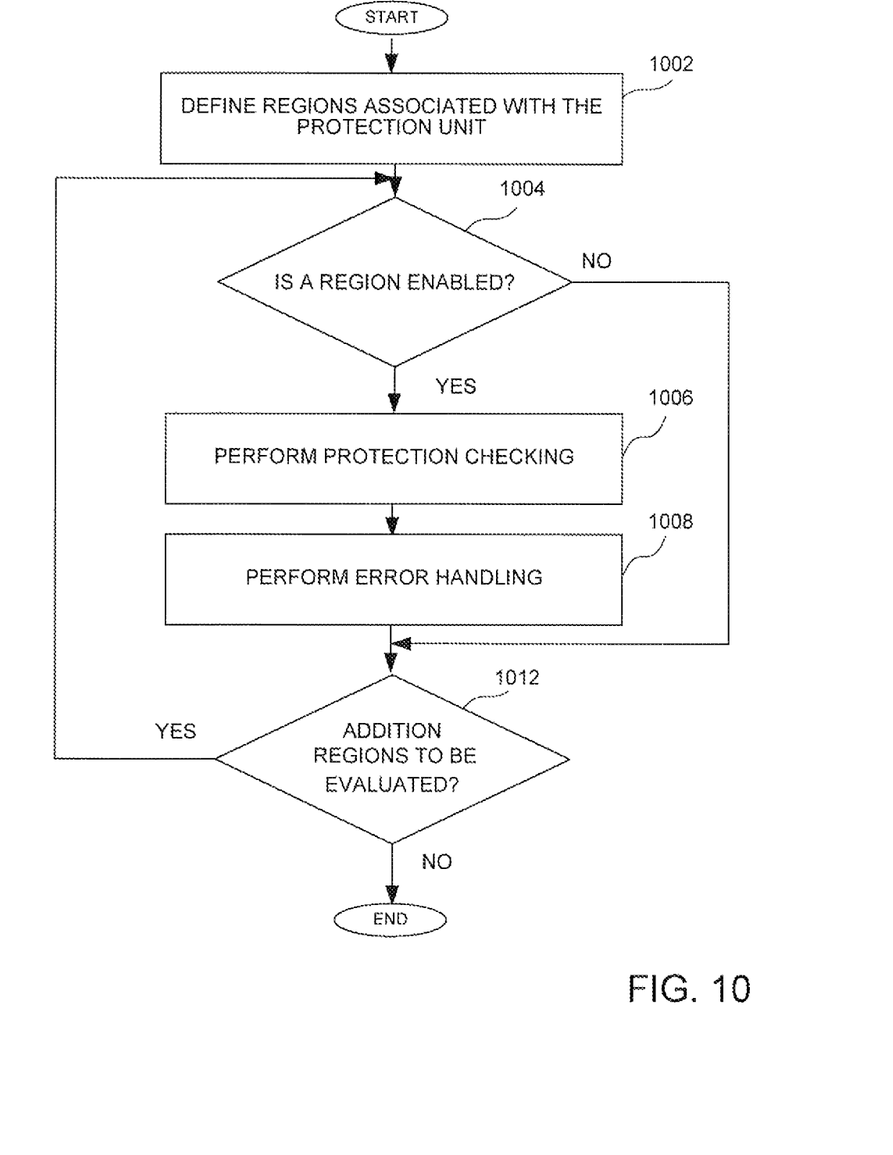
FIG. 10 is a flow chart showing a method of performing protection checking and error handing associated with regions of an integrated circuit.

Turning now to FIG. 10, a flow chart shows a method of performing protection checking and error handing associated with regions of an integrated circuit. Regions associated with the protection circuit are defined at a block 1002. The regions could be defined as set forth above. It is then determined whether a region is enabled at a block 1004. If so, protection checking is performed at a block 1006. Protection checking may include the various checks to determine whether an access is authorized, as set forth above, for example. Error handling is performed at a block 1008. Error handing could include the poisoning of a request, including the poisoning methods set forth above. It is then determined if addition regions are to be evaluated at a block 1010.

Figure 11:
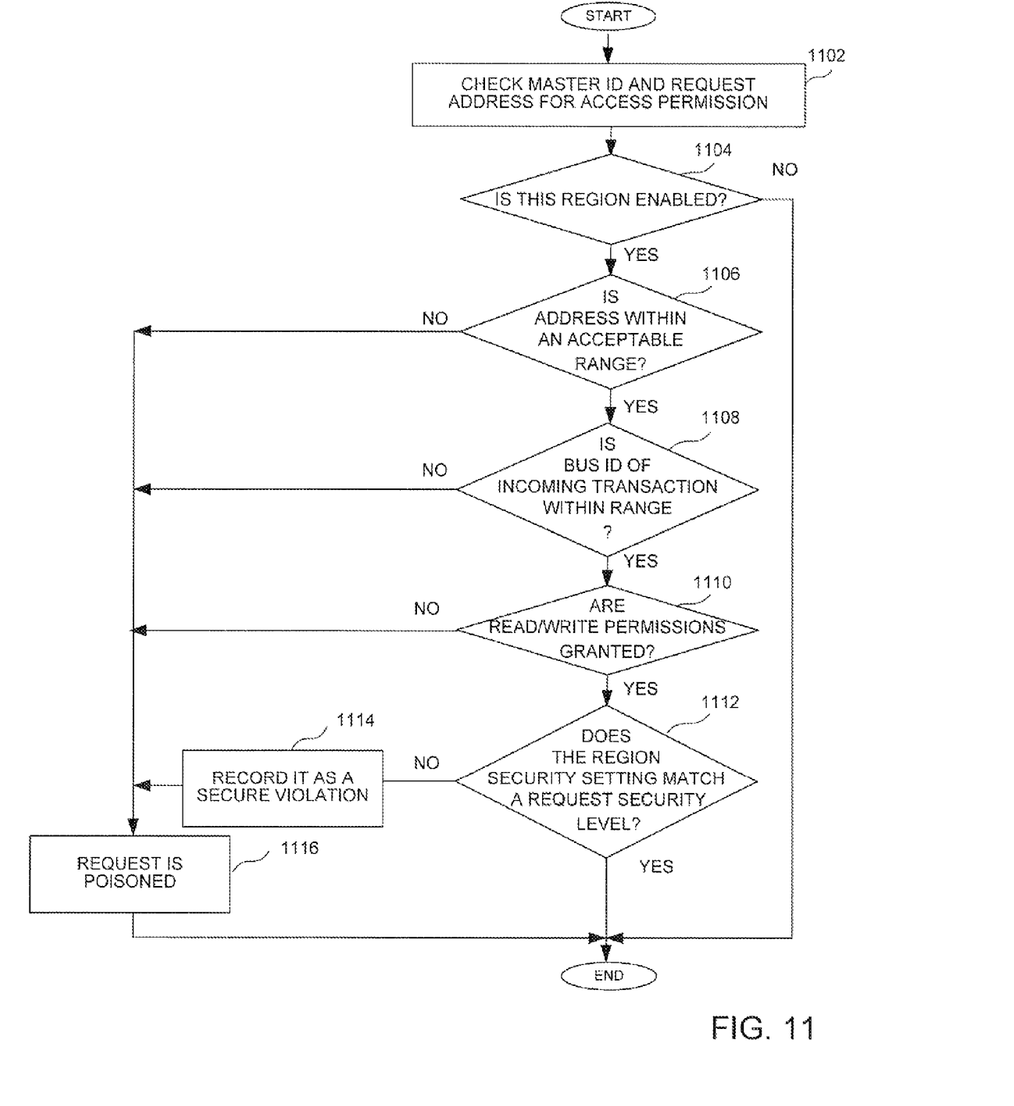
FIG. 11 is a flow chart showing a method of poisoning a request for access permission in an integrated circuit.

Turning now to FIG. 11, a flow chart shows a method of poisoning a request for access permission in an integrated circuit. A master ID and request address are checked for access permission at a block 1102. It is determined whether the current region is enabled at a block 1104. If the current region is not enabled, the process for determining access permission is ended for that region. If the current region is enabled, it is further determined whether an address within an acceptable range is received at a block 1106. If the address is within acceptable range, it is then determined if an ID of incoming transaction is within at acceptable range at a block 1108. If so, read/write permissions are then checked at a block 1110. If read/write permissions are granted, it is also determined whether a region security setting matches a request security level at a block 1112. If so, the access is allowed. If not, it is recorded as a secure violation at a block 1114. If any of the tests at blocks 1106-1112 fail, a poisoned request at a block 1116. Examples of how an address or an ID can be determined to be within an acceptable range or read/write permissions can be implemented set forth above. This check of FIG. 11 would be performed for each region, where the regions may have different priorities which would be considered in determining whether access is allowed, as set forth above. It should be noted that the method of FIG. 11 as shown applies when the DefWrAllowed/DefRdAllowed and the WrAllowed/RdAllowed to Table 2 are each set to 1, but could be modified to accommodate the selection of other entries of Table 2.

The various elements of the methods of FIGS. 9-11 may be implemented using the circuits of FIGS. 1-8 as described, or using some other suitable circuits. While specific elements of the method are described, it should be understood that additional elements of the methods, or additional details related to the elements, could be implemented according to the disclosure of FIGS. 1-8.

It can therefore be appreciated that the new and novel circuits and methods of preventing unauthorized access in an integrated circuit has been described. It will be appreciated by those skilled in the art that numerous alternatives and equivalents will be seen to exist which incorporate the disclosed invention. As a result, the invention is not to be limited by the foregoing embodiments, but only by the following claims.

We claim:

1. A circuit for preventing unauthorized access in an integrated circuit, the circuit comprising:
    a plurality of circuit blocks; and
    a plurality of protection circuits, each protection circuit being coupled to an input of a corresponding circuit block of the plurality of circuit blocks;
    wherein each protection circuit determines whether an access request to the corresponding circuit block is authorized;
    wherein a protection circuit of the plurality of protection circuits generates a poisoned request if it is determined that an access request is not authorized; and
    wherein the poisoned request comprises an address associated with a poisoned address space.

2. The circuit of claim 1 wherein a circuit block of the plurality of circuit blocks comprises a memory controller.

3. The circuit of claim 1 wherein a circuit block of the plurality of circuit blocks comprises a peripheral device.

4. A circuit for preventing unauthorized access in an integrated circuit, the circuit comprising:
    a plurality of circuit blocks; and
    a plurality of protection circuits, each protection circuit being coupled to an input of a corresponding circuit block of the plurality of circuit blocks;
    wherein each protection circuit determines whether an access request to the corresponding circuit block is authorized;
    wherein a protection circuit of the plurality of protection circuits generates a poisoned request if it is determined that an access request is not authorized; and
    wherein the poisoned request comprises a poisoned attribute.

5. The circuit of claim 1 wherein the integrated circuit device comprises an SoC implementing the plurality of circuit blocks in a plurality of die, and the plurality of protection circuits prevents unauthorized access to a die of the plurality of die.

6. A circuit for preventing unauthorized access in an integrated circuit, the circuit comprising:
    a plurality of master devices;
    a plurality of slave devices coupled to the plurality of master devices, each slave device of the plurality of slave devices having an input for receiving an access request from a master device; and
    a plurality of protection circuits coupled to inputs of corresponding slave devices of the plurality of slave devices, the plurality of protection circuits enabling isolation of slave devices of the plurality of slave devices from master devices of the plurality of master devices;
    wherein each protection circuit determines whether an access request to the corresponding slave device is authorized; and
    wherein an access request that is not authorized includes a poisoned attribute, including an indication that the access request is not authorized, with the access request provided to a receiver of the access request by a protection circuit, and the slave circuit provides a response to the access request.

7. The circuit of claim 6 wherein each master device of the plurality of master devices comprises a master ID, and access to a slave device is determined in response to evaluating a master ID received from a master device.

8. The circuit of claim 6 wherein each protection circuit of the plurality of protection circuits comprises a check block for each region of a plurality of regions defined by a start address and an end address.

9. The circuit of claim 8 wherein a region of the plurality of regions may be enabled or disabled, and an access request to a disabled region is ignored.

10. The circuit of claim 6 wherein determining whether an access request to the corresponding slave device is authorized comprises determining whether a read or write permission check fails.

11. The circuit of claim 6 wherein a region of a plurality of regions many be configured as a secure region, and a secure access request is required to access the region.

12. The circuit of claim 11 wherein an unauthorized request to a secure region is recorded as a secure violation.

13. A method of preventing unauthorized access in an integrated circuit, the method comprising:
    providing a plurality of circuit blocks;
    providing a plurality of protection circuits, wherein each protection circuit is coupled to an input of a corresponding circuit block of the plurality of circuit blocks;
    determining, by a protection circuit of the plurality of protection circuits, whether an access request to the corresponding circuit block is authorized; and
    providing a poisoned access request in response to an unauthorized access request by providing an address associated with a poisoned address space.

14. The method of claim 13 wherein coupling each protection circuit to an input of a corresponding circuit block comprises coupling each protection circuit to an input of a corresponding slave device, wherein an access request from a master device of the plurality of circuit blocks is provided to the corresponding slave device.

15. The method of claim 13 wherein providing a poised poisoned access request comprises providing a poisoned attribute.

16. The method of claim 13 further comprising associating the plurality of protection circuits with a plurality of regions defined by a start address and an end address.

* * * * *